US008316230B2

(12) United States Patent
Ben-Menahem et al.

(10) Patent No.: US 8,316,230 B2
(45) Date of Patent: Nov. 20, 2012

(54) SERVICE FOR DETERMINING WHETHER DIGITAL CERTIFICATE HAS BEEN REVOKED

(75) Inventors: Avi Ben-Menahem, Sammamish, WA (US); Monica I. Ene-Pietrosanu, Redmond, WA (US); Vishal Agarwal, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1044 days.

(21) Appl. No.: 11/273,908

(22) Filed: Nov. 14, 2005

(65) Prior Publication Data

US 2007/0113074 A1    May 17, 2007

(51) Int. Cl.
*G06F 21/00* (2006.01)
(52) U.S. Cl. ............... 713/158; 726/4; 726/6; 726/175; 705/36; 705/38; 705/51; 705/65
(58) Field of Classification Search .......... 713/156–158; 726/10
See application file for complete search history.

(56) References Cited

U.S. PATENT DOCUMENTS

| | | | | |
|---|---|---|---|---|
| 5,687,235 A * | 11/1997 | Perlman et al. | ............... | 713/158 |
| 5,966,707 A * | 10/1999 | Van Huben et al. | ............... | 1/1 |
| 6,044,462 A | 3/2000 | Zubeldia et al. | ............... | 713/158 |
| 6,134,550 A * | 10/2000 | Van Oorschot et al. | ............... | 1/1 |
| 6,230,266 B1 * | 5/2001 | Perlman et al. | ............... | 713/158 |
| 6,345,256 B1 | 2/2002 | Milsted et al. | ............... | 705/1 |
| 6,748,531 B1 * | 6/2004 | Epstein | ............... | 713/158 |
| 7,073,055 B1 * | 7/2006 | Freed et al. | ............... | 713/155 |
| 7,580,988 B2 * | 8/2009 | Rudd | ............... | 709/217 |
| 7,644,284 B1 * | 1/2010 | Stubblebine | ............... | 713/178 |
| 7,653,815 B2 * | 1/2010 | Godfrey et al. | ............... | 713/176 |
| 7,743,248 B2 * | 6/2010 | Bisbee et al. | ............... | 713/158 |
| 2002/0004773 A1 * | 1/2002 | Xu et al. | ............... | 705/36 |
| 2002/0099668 A1 * | 7/2002 | Perlman | ............... | 705/76 |
| 2002/0099822 A1 * | 7/2002 | Rubin et al. | ............... | 709/225 |
| 2002/0147905 A1 * | 10/2002 | Perlman | ............... | 713/157 |
| 2002/0152387 A1 | 10/2002 | Asano | ............... | 713/176 |

(Continued)

FOREIGN PATENT DOCUMENTS

WO    2004/010271    1/2004

OTHER PUBLICATIONS

A Sophisticated OCSP Client Provider for Certificate Validation|http://www.ascertia.com/Downloads/datasheets/ARP-Datasheet.pdf|Rod Crook|pp. 1-2|2009.*

(Continued)

*Primary Examiner* — Taghi Arani
*Assistant Examiner* — Mahfuzur Rahman
(74) *Attorney, Agent, or Firm* — Merchant & Gould P.C.

(57) ABSTRACT

A revocation determination service determines for a client whether a particular digital certificate as issued by a particular certificate authority (CA) has been revoked by such CA. In the service, an engine receives a query from the client, where the query identifies the particular certificate and the CA that issued the particular certificate. At least one provider is resident at the service, where each provider corresponds to a revocation information repository and represents the corresponding repository at the service, and connects to the corresponding repository. Each repository has revocation information from at least one CA. A configuration store includes a configuration information record corresponding to each provider resident at the service. Each configuration information record includes an identification of the provider and of each CA that the repository corresponding to such provider has revocation information for.

15 Claims, 4 Drawing Sheets

U.S. PATENT DOCUMENTS

| | | | |
|---|---|---|---|
| 2002/0184182 A1* | 12/2002 | Kwan | 707/1 |
| 2003/0221101 A1* | 11/2003 | Micali | 713/157 |
| 2004/0133520 A1 | 7/2004 | Callas et al. | 705/51 |
| 2005/0172128 A1* | 8/2005 | Little et al. | 713/168 |
| 2005/0228998 A1* | 10/2005 | Chan et al. | 713/175 |
| 2005/0262345 A1* | 11/2005 | Moreau | 713/173 |
| 2008/0196091 A1 | 8/2008 | Kostal et al. | |

OTHER PUBLICATIONS

First Office Action, dated Oct. 30, 2009, issued in Chinese Application No. 200680042194.5, 9 pp.

International Preliminary Report on Patentability issued May 14, 2008 for PCT/US/2006/044314, 5 pp.

Written Opinion of the International Searching Authority and Search Report dated Apr. 4, 2007 for PCT/US/2006/044314, 10 pp.

Russian Notice of Allowance in Application 2008118893, mailed Mar. 18, 2011, 10 pgs.

Australian First Office Action mailed Oct. 29, 2010, in Application No. 2006315415 (2 pages).

Australian Second Office Action mailed Nov. 30, 2011, in Application No. 2006315415 (2 pages).

Australian Notice of Acceptance mailed Feb. 20, 2012, in Application No. 2006315415 (3 pages).

Chinese Second Office Action mailed Jul. 11, 2011, in Application No. 200680042194 (16 pages).

Chinese Third Office Action mailed Nov. 18, 2011, in Application No. 200680042194 (11 pages).

Chinese Final Rejection in Application 200680042194.5, mailed Jul. 11, 2012, 12 pgs (with English translation).

* cited by examiner

SERVICE FOR DETERMINING WHETHER DIGITAL CERTIFICATE HAS BEEN REVOKED

TECHNICAL FIELD

The present invention relates to a service such as that which may be provided by a networked server or the like, where the service may be queried by a client to determine whether a particular digital certificate to be employed by the client has been revoked. More specifically, the present invention relates to such a service where the client may query the service on a real-time or near-real-time basis such that the client need not maintain any local revocation lists or the like.

BACKGROUND OF THE INVENTION

As is known, digital certificates are being employed in networked environments to, among other things, act as a proffer that the owner of the certificate is indeed the entity named in the certificate, and also to act as a proffer that some corresponding element to which the certificate is related is authentic and/or trustworthy or the like. For example, a digital application that is to be operated on a computing device may be accompanied by an application certificate proffering that the application can be trusted to operate in a particular manner. Likewise, a user operating such a computing device may be represented thereon and/or elsewhere by a user certificate proffering that the user is a particular person, has particular user rights, belongs to particular user groups, etc. As may be appreciated, other instances where a digital certificate may be employed include in connection with digital constructs such as digital files, digital content, digital licenses for employing digital content, and the like. Similarly, a digital certificate may be issued for a computing device itself, and various of the hardware elements (the hard drive, the processor, the video card, etc.) and software elements (the BIOS, the operating system, the graphics sub-system, etc.) within the computing device may each have a digital certificate.

Typically, a digital certificate is issued by a particular certificate authority as identified in the certificate to the named owner as set forth in the certificate, and includes therein one or more cryptographic keys such as for example a public key from a public-private key pair. Especially in the case where such key is indeed a public key, a corresponding private key is associated with such certificate and is presumably held closely as a secret by the named owner of the certificate.

Thus, among other things, the named owner may employ the private key to digitally sign some sort of electronic document, and may attach the certificate to the electronic document. A recipient of the electronic document with the certificate may at some point then validate the digital signature with the public key from the certificate, as is known, to confirm that the electronic document has not been modified, among other things. Of course, digital certificates may also be employed in many other circumstances.

As is known, a digital certificate as issued by a certificate authority may include a chain of digital certificates leading back to a root digital certificate from a trusted root authority, where each certificate in the chain includes a public key that can be employed to validate the signature of the next certificate down the chain, presuming that a client with the chain of certificates has knowledge of the public key of the root certificate. Thus, for a client to validate a particular certificate with an attached chain of certificates, the client first validates each certificate in the chain from the root certificate down to the particular certificate. In addition, if any further certificate is issued based on the particular certificate, i.e., is signed by the private key corresponding to such particular certificate, such further certificate can be validated by continuing the process down the chain to such further certificate.

Significantly, a certificate authority that issues a particular certificate typically has the power to revoke same. Reasons for revoking a certificate are many and varied, and can for example include age of the certificate and/or the underlying entity represented by the certificate, and changed status. Principally, though, a certificate is revoked when the information in such certificate can no longer be relied on to be accurate. Notably, a certificate may be revoked by the issuing certificate authority if it is determined that the private key corresponding to such certificate has been publicized or otherwise disclosed, with the result being that anybody with such private key can employ same to digitally sign, and not just the owner of the certificate. Also notably, a certificate may be revoked by the issuing certificate authority if such certificate authority discovers that the named owner is improperly employing the certificate, such as for example by misrepresenting that an element can be trusted based on the certificate, or by employing the certificate for a different purpose than that which the certificate was issued.

To revoke a certificate, the issuing certificate authority or the like may for example publicly listing the public key associated with the certificate in an accessible location. Heretofore, such accessible location was a digital revocation list that was periodically provided to each client, for example as an attachment to another digital construct. Thus, the client in verifying any particular certificate to authenticate the corresponding element may obtain from the issuer thereof a corresponding revocation list and review same to determine whether the certificate is revoked, and if so may refuse to honor the certificate and correspondingly refuse to honor/authenticate/trust/etc. the digital element to which the certificate corresponds.

However, and significantly, obtaining and reviewing revocation lists can quickly become cumbersome if not oppressive for a client, especially if the client requires revocation lists from multiple certificate authorities, and also especially if the revocation lists become large and/or complicated in structure. Moreover, and at any rate, it is to be appreciated that inasmuch as revocation lists are not necessarily provided immediately to a client and/or are not necessarily obtained immediately by a client, a certificate that has been revoked may nevertheless be honored by the client for quite some time until a corresponding revocation list is in fact in the possession of the client.

Accordingly, a need exists for a centralized service with access to current revocation information such that a client can in a prompt and current fashion determine whether a particular digital certificate has been revoked. In particular, a need exists for such a centralized service that can access multiple repositories of revocation information such that the client can contact the service to obtain revocation information relating to a certificate as issued by any of a plurality of certificate authorities. Moreover, a need exists for such a centralized service that allows for easily adding additional repositories of revocation information and that is easily configured to locate the appropriate repository of revocation information for any of a plurality of particular certificates.

SUMMARY OF THE INVENTION

The aforementioned needs are satisfied at least in part by the present invention in which a revocation determination service determines for a client whether a particular digital certificate as issued by a particular certificate authority (CA) has been revoked by such CA. In the service, an engine receives a query from the client, where the query identifies the particular certificate and the CA that issued the particular certificate. At least one provider is resident at the service, where each provider corresponds to a revocation information repository and represents the corresponding repository at the service, and connects to the corresponding repository. Each repository has revocation information from at least one CA. Each provider in response to the query from the client being forwarded thereto determines whether the particular certificate is identified within the corresponding repository as being revoked.

The service also has a configuration store that includes a configuration information record corresponding to each provider resident at the service. Each configuration information record includes an identification of the provider and of each CA that the repository corresponding to such provider has revocation information for. The engine based on the received query, then, refers to the configuration store to identify a particular provider resident at the service and corresponding to the identified CA of the received query to process same, and in fact forwards the received query to the identified provider to determine whether the identified certificate of the received query is identified within the corresponding repository as being revoked. The service can process queries from the client regarding a digital certificate issued by any of multiple CAs by way of having access to one or more corresponding repositories, each by way of a corresponding provider.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
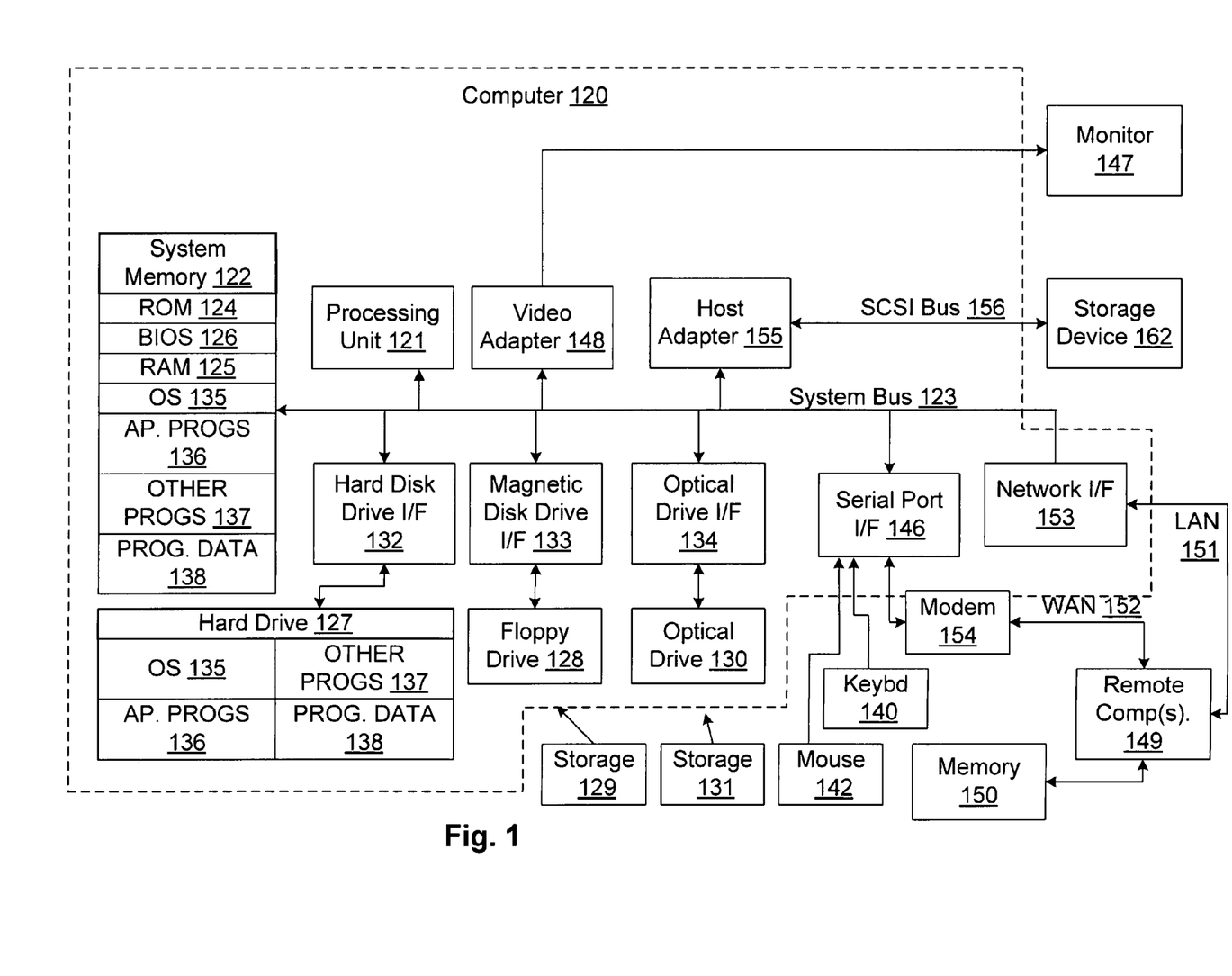
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet. The personal computer 120 may also act as a host to a guest such as another personal computer 120, a more specialized device such as a portable player or portable data assistant, or the like, whereby the host downloads data to and/or uploads data from the guest, among other things.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Service for Determining whether Digital Certificate has been Revoked

Figure 2:
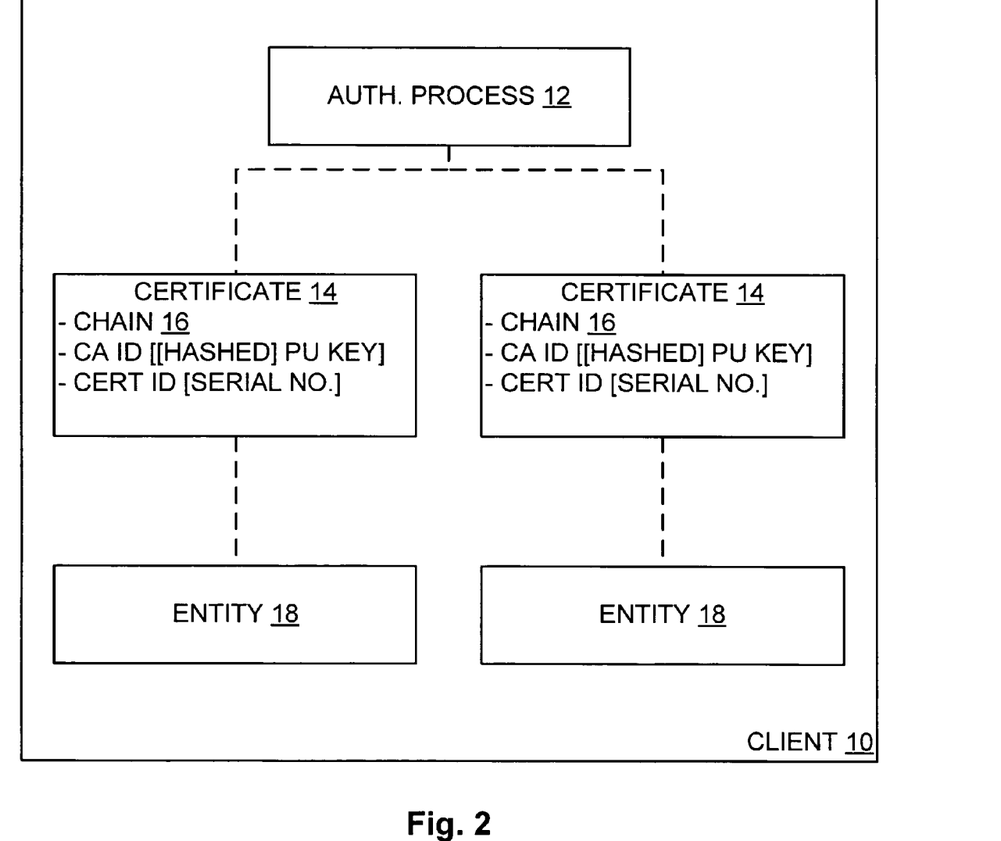
FIG. 2 is a block diagram of a client that would employ a certificate revocation determination service in one embodiment of the present invention.

As was set forth above, and turning now to FIG. 2, in a client 10 such as a computing device or the like, some form of authentication process 12 performs functions including validating certificates 14 and chains thereof 16 that each are associated with an entity 18 to authenticate such entity 18. Significantly, as part of validating each certificate 14, the authentication process 12 ensures that the certificate 14 is not revoked by the certificate authority (CA) that issued such certificate 14 or the like. Upon determining that the certificate 24 has not been revoked, the authentication process 12 can employ the non-revoked certificate 24 on the client 10 to perform operations, presuming of course that certificate otherwise validates.

Note that the client 10 and the authentication process 12 thereon can be any client and authentication process without departing from the spirit and scope of the present invention. For example, the client 10 may be a computing device such as a personal computer, a portable player, a server, an intelligent appliance, a networked portable device, or any other digital processing device that employs digital certificates 14. Likewise, the authentication process 12 may be a part of a rights-management system on the client 10 to ensure that digital content or the like is rendered only in accordance with rights as set forth in a corresponding digital license or the like.

In one embodiment of the present invention, a certificate 14 is revoked by the certificate authority (CA) that issued same or the like by being identified within a revocation information repository 20 (FIG. 3) or the like as indeed being revoked. Significantly, such repository 20 may include a list, a database, a file, or the like with information relating to each certificate 14 that has been revoked, and may include a server or the like (not shown) for serving revocation determinations in response to corresponding requests. Thus, the authentication process 12 of the client 10 need not necessarily be provided with information on revocations by way of revocation list or the like. Likewise, such authentication process 12 the client 10 can by way of appropriate request determine by way of a corresponding repository 20 a current revocation status for a particular certificate 14, without latency that is incumbent in a revocation list.

Figure 3:
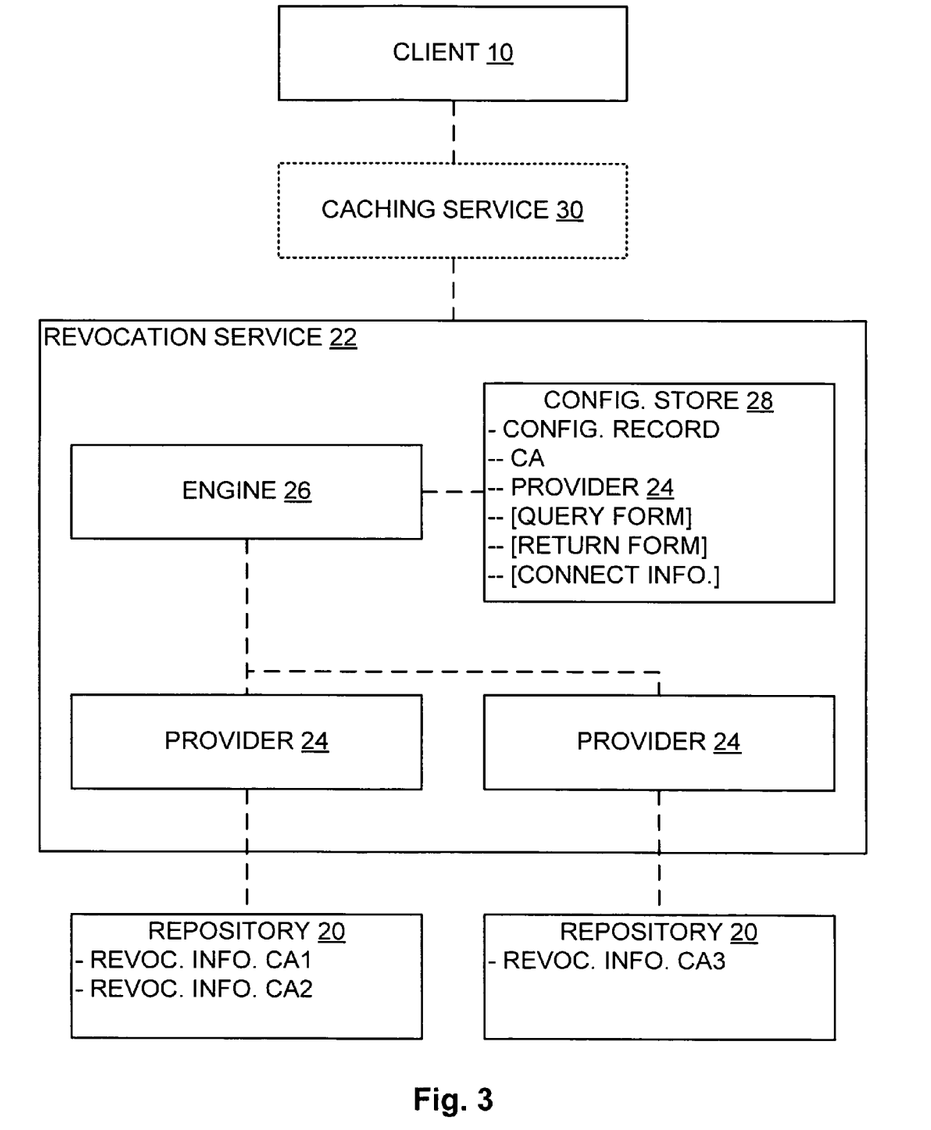
FIG. 3 is a block diagram of the certificate revocation determination service as employed by the client of FIG. 2 in one embodiment of the present invention.

In one embodiment of the present invention, and turning now to FIG. 3, the client 10 obtains revocation information with regard to a particular certificate 14 by way of a query to a revocation service 22. As may be appreciated, such service 22 may be local to or remote from the client 10, and in the latter case is connected to the client 10 by way of an appropriate network connection. Moreover, in one embodiment of the present invention, the service 22 can service requests from the client 10 regarding a certificate 14 from any of multiple CAs by way of having access to one or more revocation repositories 20, each by way of an appropriate provider 24.

As may be appreciated, each repository 20 may have revocation information from one or more CAs, and the revocation information as it appears in the repository 20 may take any appropriate form without departing from the spirit and scope of the present invention. For example, the revocation information may merely list each certificate 14 that has been revoked, or may list a number of series of revoked certificates 14, as appropriate. Likewise, the revocation information for each revoked certificate 14 may merely by a simple assertion of revocation, or may include further details, such as for example a date of revocation and/or a reason for revocation. In fact, it may even be the case that a determination of revocation requires the use of logic or computer code, in which case such logic or computer code may be included within the revocation information. Each repository 20 may be local to or remote from the service 22, and in the latter case is connected to the service 22 by way of an appropriate network connection.

As may also be appreciated, each provider 24 is resident at the service 22 and represents a corresponding repository 20 to the service 22. In one embodiment of the present invention, each provider 24 is in the form of a plug-in module or the like that can be added to or removed from the service 22 at will. Thus, adding or removing access to a repository at the service 22 is generally a matter of adding or removing a corresponding provider 24 to/from the service 22. In response to a query from a client 10 as received at an engine 26 of the service 22, then, the provider 24 includes functionality necessary to interact with the engine 26 to receive some form of the query therefrom, to connect to the repository 20, to send the query to the repository 20, to receive a response in return from the repository 20, and to in turn return some form of the response to the engine 26. Such functionality is known or should be apparent to the relevant public, and therefore need not be set forth herein in any detail. Accordingly, any appropriate type or version of such functionality may be employed without departing from the spirit and scope of the present invention, presuming of course that such functionality in fact allows the service 22 to obtain appropriate revocation information from the repository 20 corresponding to the provider 24.

Note that each provider 24 may include all necessary configuration information for configuring the service 22 to employ such provider 24, or may include less than all of such configuration information with the expectation that the remainder of such configuration information is obtained elsewhere for the service 22 and/or is manually entered into the service 22. Principally, for each provider 24, the configuration information corresponding thereto should include an identification of each CA that the repository 20 corresponding to such provider 24 has revocation information for. In addition, such configuration information generally should include a particular form in which the query should appear from the engine 26, if indeed the service 22 allows variation in such form, and a particular form in which the returned response to the engine 26 appears, again if indeed the service 22 allows variation in such form. Of course, the configuration information may include other information without departing from the spirit and scope of the present invention. For example, and among other things, it may be the case that the configuration information includes connection information relating to how the corresponding provider 24 is to connect to the corresponding repository 20.

In one embodiment of the present invention, a record of such configuration information for each provider 24 at the service 22 is stored at the service 22 within a configuration store 28, along with an identification of the provider 24. Such a configuration store 28, then, would have a record of configuration information for each provider 24 currently resident or 'plugged-in' at the service 22, and as may be appreciated thus acts as a map to identify a provider 24 that handles a query for revocation information regarding a certificate 14 as issued by a particular CA. Thus, based on each query as received at the engine 26, where the query includes an identification of a particular certificate 14 and an identification of the CA that issued the particular certificate 14, the engine 26 identifies or maps to a provider 24 to process the query from the configuration information in the configuration store 28 according to the CA that issued the certificate 14.

Note that the identification of a particular certificate 14 and the identification of the CA that issued the particular certificate 14 as may be found in a query from a client 10 to the service 22 can be in any particular format without departing from the spirit and scope of the present invention. Typically, though, such identifications are obtained by the client 10 from the particular certificate, where the identification of the particular certificate 14 is in the form of a serial number as issued by the CA and as set forth within the certificate 14, and where the identification of the CA is in the form of the public key of the CA as set forth within the certificate 14, perhaps in a hashed form (FIG. 2).

Figure 4:
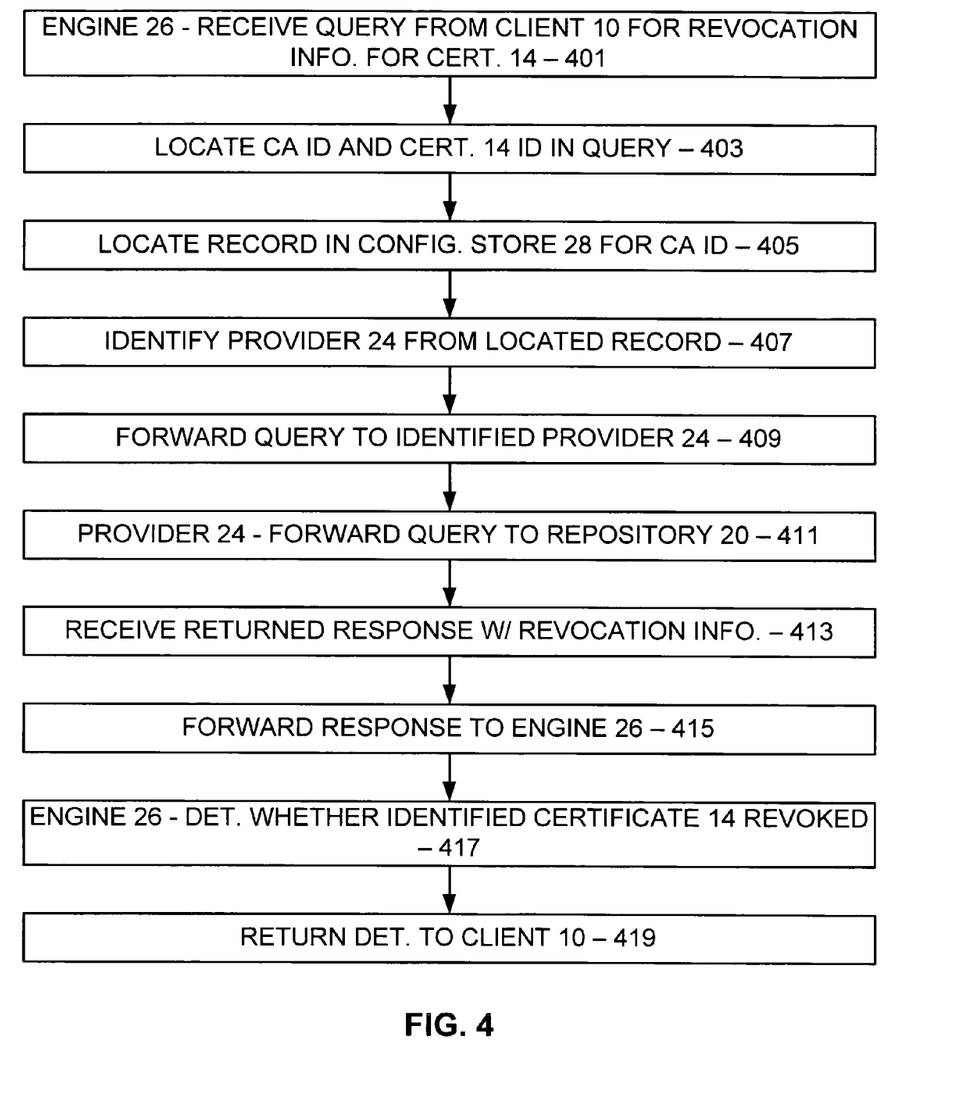
FIG. 4 is a flow diagram showing key steps performed by the revocation determination service of FIG. 3 in servicing a query from the client of FIG. 2 to determine whether a particular certificate has been revoked, in accordance with one embodiment of the present invention.

At any rate, and turning now to FIG. 4, the engine 26 upon receiving a query from a client 10 for revocation information for a particular certificate 14 (step 401) locates the identified CA and the identified certificate 14 within the query (step 403), locates a record of the configuration information in the configuration store 28 that corresponds to the identified CA (step 405), and identifies from the located record a corresponding plugged-in provider 24 to process the query (step 407). In addition, and if necessary, the engine 26 may locate within the located record the particular form that the identified provider 24 expects to receive the query from the engine 26, the particular form that the identified provider 24 will return the response to the engine 26, and/or other information, if necessary.

Based on the located record of the configuration information, then, the engine 26 can appropriately format the query for the identified provider 24, if necessary, forward the query to such provider 24 (step 409), and await a returned response. Note here that the query as forwarded to the provider 24 should at least contain the identification of the certificate 24. Of course, if necessary, the query as forwarded to the provider 24 should also contain the identification of the CA, especially if the corresponding repository 20 handles revocation information from more than one CA.

At any rate, and as may be appreciated, the provider 24 based on the forwarded query further forwards some version of same to the corresponding repository 20 (step 411), receives a returned response therefrom with appropriate revocation information corresponding to the identified certificate 14 (step 413), and forwards some version of the returned response back to the engine 26 (step 415). With such returned response, then, the engine 26 determines whether the identified certificate 14 has been revoked (step 417) and returns a response to the querying client 10 regarding same (step 419).

Note that the returned response from the engine 26 to the querying client 10 may be in any form without departing from the spirit and scope of the present invention. For example, the returned response may simply state whether the identified certificate 14 has been revoked, or may provide additional information including some or all of any additional information as provided by the provider 24. Examples of such additional information include but are not limited to a date and/or circumstances of revocation if available and applicable. As may be appreciated, such additional information may be of value to the querying client 10, especially if the client 10 employs same to produce a final determination of revocation.

Note that especially in a high-throughput environment where the service can be expected to receive many queries for revocation information from clients 10 and where many of the queries are with regard to the same certificates 14, it may be advantageous to include a front-end caching service 30, as is shown in FIG. 3. As may be appreciated, and in one embodiment of the present invention, such a caching service 30 would act as a first line that would initially receive queries from clients 10 and for each query would determine whether such caching service 30 has relatively current cached revocation information that could be employed to respond to such query. If so, the caching service 30 would respond to such query with such relatively current cached revocation information without the need to forward the query to the service 22. However, if not, the caching service 30 would instead forward the query to the service 22 for further processing in the manner set forth above. In addition, and as should now be appreciated, upon the service 22 returning a response to the client 10 as at step 419 of FIG. 4, the response would be passed through the caching service 30 to cache same for responding to a future query as appropriate.

Note that any appropriate form of caching service 30 may be employed without departing from the spirit and scope of the present invention. Inasmuch as caching is generally know or should be apparent to the relevant public, particulars of such a caching service 30 need not be set forth herein in any detail. Note, too, that defining whether cached revocation information is relatively current may be performed in any manner without departing from the spirit and scope of the present invention. For example, it may be the case that cached information older than a set period of time, such as for example 12 or 24 hours, is to be deemed not current. Similarly, it may be the case that cached information is deemed to be not current based on a varying scale that varies according to how often the cached information is accessed.

CONCLUSION

Although the present invention is especially useful in connection with a client 10 such as a personal computer, a server, or the like, the present invention may be practiced with regard to any appropriate client 10, all without departing from the spirit and scope of the present invention. Accordingly, the client 10 is to be interpreted to encompass any appropriate device that employs certificates 14 and has a need to determine whether a particular certificate 14 has been revoked.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful centralized service 22 with access to current revocation information such that a client 10 can in a prompt and current fashion determine whether a particular digital certificate 14 has been revoked. The centralized service 22 can access multiple repositories 20 of revocation information such that the client 10 can contact the service to obtain revocation information relating to a certificate 14 as issued by any of a plurality of certificate authorities (CAs). Each additional repository 20 of revocation information can be easily added by way of adding an appropriate corresponding provider 24 to the service 22, and the service 22 by way of each provider 24 can easily be configured to locate the appropriate repository 20 of revocation information for any of a plurality of particular certificates 14. It should be understood, therefore, that this invention is not limited to the particular embodiments disclosed, but it is intended to cover modifications within the spirit and scope of the present invention as defined by the appended claims.

The invention claimed is:

1. A revocation determination service for determining for a client whether a first digital certificate as issued by a first certificate authority (CA) has been revoked by the first CA and whether a second digital certificate as issued by a second CA has been revoked by the second CA, the service comprising:

at least one processing unit; and at least one memory, communicatively coupled to the at least one processing unit and containing instructions that, when executed by the at least one processing unit, provide modules, comprising:

an engine that receives a first query from the client, the received first query identifying the first digital certificate and identifying the first CA that issued the first digital certificate and a second query from the client, the received second query identifying the second digital certificate and identifying the second CA that issued the second digital certificate;

a first provider and a second provider resident at the revocation determination service, wherein each of the first and the second provider corresponds to a separate revocation information repository, wherein each corresponding revocation information repository has revocation information for one or more CAs, and wherein the first provider corresponds to a first revocation information repository having revocation information for the first CA and not for the second CA and the second provider corresponds to a second revocation information repository having revocation information for the second CA and not for the first CA; and a configuration store comprising a configuration information record corresponding to each of the first and the second provider resident at the revocation determination service, wherein a first configuration information record corresponding to the first provider comprises:

an identification of the first provider;

an identification of the first CA;

an indication of a particular format in which the received first query should be forwarded from the engine to the first provider for the first CA; and an indication of a particular format in which a returned response to the engine is to appear from the first provider for the first CA, and wherein a second configuration information record corresponding to the second provider comprises:

an identification of the second provider;

an identification of the second CA, and wherein the engine:

retrieves the first configuration information record for the first provider from the configuration store based on the received first query and forwards, based on the first configuration information record, the received first query to the first provider according to the indicated particular format for the first CA; and retrieves the second configuration information record for the second provider from the configuration store based on the received second query and forwards, based on the second configuration information record, the received second query to the second provider;

and wherein the first provider connects to the first revocation information repository having first revocation information for the first CA, wherein the first revocation information comprises logic for determining whether the first digital certificate has been revoked, and wherein the first provider determines whether the first digital certificate of the received query is revoked based on the first revocation information;

and wherein the second provider connects to the second revocation information repository having second revocation information for the second CA, wherein the second revocation information comprises logic for determining whether the second digital certificate has been revoked, and wherein the second provider determines whether the second digital certificate of the received second query is revoked based on the second revocation information.

2. The revocation determination service of claim 1 wherein each provider resident on the revocation determination service is in the form of a plug-in module that can be added to or removed from the revocation determination service at will to add or remove access to the corresponding revocation information repository.

3. The revocation determination service of claim 2 wherein each provider includes at least some configuration information for configuring the revocation determination service to employ such provider and the corresponding revocation information repository, the included configuration information being stored in a corresponding configuration information record in the configuration store when each provider is added to the revocation determination service.

4. The revocation determination service of claim 1 wherein each provider interacts with the engine to obtain the received query, to connect to the corresponding revocation information repository, to forward the received query to the corresponding revocation information repository, to receive a response from the corresponding revocation information repository, and to return the response to the engine.

5. The revocation determination service of claim 1 wherein the configuration information record corresponding to each provider in the configuration store further includes connection information relating to how such provider is to connect to the corresponding revocation information repository.

6. The revocation determination service of claim 1 further comprising a front-end caching service to initially receive a query from the client and to determine whether such caching service has relatively current cached revocation information that can be employed to respond to the initially received query.

7. A computing device having instantiated thereon a revocation determination service for determining for a client whether a first certificate as issued by a first certificate authority (CA) has been revoked by the first CA and whether a second digital certificate as issued by a second CA has been revoked by the second CA, the service comprising:
- an engine that receives a query from the client, wherein the received first query identifies the first digital certificate and identifies the first CA that issued the first digital certificate and a second query from the client, the received second query identifying the second digital certificate and identifying the second CA that issued the second digital certificate;
- a first provider and a second provider resident at the revocation determination service, wherein each of the first and the second provider corresponds to a separate revocation information repository, wherein each corresponding revocation information repository has revocation information for one or more CAs, and wherein the first provider corresponds to a first revocation information repository having revocation information for the first CA and the second provider corresponds to a second revocation information repository having revocation information for the second CA; and
- a configuration store comprising a configuration information record corresponding to each of the first and the second provider resident at the revocation determination service,
- wherein a first configuration information record corresponding to the first provider comprises:
  - an identification of the first provider;
  - an identification of the first CA; and
  - an indication of a particular format in which the received query should be forwarded from the engine to the first provider for the first CA; and
  - an indication of a particular format in which a returned response to the engine is to appear from the first provider for the first CA,
- and wherein a second configuration information record corresponding to the second provider comprises:
  - an identification of the second provider;
  - an identification of the second CA,
- and wherein the engine:
  - retrieves the first configuration information record for the first provider from the configuration store based on the received first query and forwards, based on the first configuration information record, the received first query to the first provider according to the indicated particular format for the first CA; and
  - retrieves the second configuration information record for the second provider from the configuration store based on the received second query and forwards, based on the second configuration information record, the received second query to the second provider;
- and wherein the first provider connects to the first revocation information repository having first revocation information for the first CA, wherein the first revocation information comprises logic for determining whether the first digital certificate has been revoked, and wherein the first provider determines whether the first digital certificate of the received query is revoked based on the first revocation information;
- and wherein the second provider connects to the second revocation information repository having second revocation information for the second CA, wherein the second revocation information comprises logic for determining whether the second digital certificate has been revoked, and wherein the second provider determines whether the second digital certificate of the received second query is revoked based on the second revocation information.

8. The computing device of claim 7 wherein each provider is in the form of a plug-in module that can be added to or removed from the revocation determination service at will to add or remove access to the corresponding revocation information repository.

9. The computing device of claim 8 wherein each provider includes at least some configuration information for configuring the revocation determination service to employ such provider and the corresponding revocation information repository, the included configuration information being stored in the corresponding configuration information record in the configuration store when each provider is added to the revocation determination service.

10. The computing device of claim 7 wherein each provider interacts with the engine to obtain the received query, to connect to the corresponding revocation information repository, to forward the received query to the corresponding revocation information repository, to receive a response from the corresponding revocation information repository, and to return the response to the engine.

11. The computing device of claim 7 wherein the configuration information record corresponding to each provider in the configuration store further comprises a particular format in which a returned response to the engine is to appear.

12. The computing device of claim 7 wherein the configuration information record corresponding to each provider in the configuration store further includes connection information relating to how such provider is to connect to the corresponding revocation information repository.

13. The computing device of claim 7 wherein the revocation determination service further comprises a front-end caching service to initially receive a query from the client and determine whether such caching service has relatively current cached revocation information that can be employed to respond to the initially received query.

14. A method for a revocation determination service to determine for a client whether a first digital certificate as issued by a first certificate authority (CA) has been revoked by the first CA and whether a second digital certificate as issued by a second CA has been revoked by the second CA, the method comprising:
- receiving a first query from the client, the received first query identifying the first digital certificate and the first CA that issued the first digital certificate;
- receiving a second query from the client, the received second query identifying the second digital certificate and the second CA that issued the second digital certificate;
- referring to a configuration store including a first configuration information record corresponding to at least a first provider resident at the revocation determination service and a second configuration information record corresponding to at least a second provider resident at the revocation determination service, the first configuration information record comprising:
  - an identification of the first provider;
  - an identification of the first CA; and an indication of a particular format in which the received first query should be forwarded from an engine to the first provider for the first CA; and an indication of a particular format in which a returned response to the engine is to appear from the first provider for the first CA, and the second configuration information record comprising:
an identification of the second provider;
an identification of the second CA; and
wherein the referring comprises identifying the first provider with respect to the received first query and the second provider with respect to the received second query, the first provider corresponding to a first revocation information repository having first revocation information for the first CA and not the second CA, wherein the first revocation information comprises logic for determining whether the first digital certificate has been revoked, and the second provider corresponding to a second revocation information repository having second revocation information for the second CA and not the first CA, wherein the second revocation information comprises logic for determining whether the second digital certificate has been revoked;

forwarding, based on the first configuration information record, the received first query to the first provider according to the particular format for the first CA;

forwarding, based on the second configuration information record, the received second query to the second provider;

determining, by the first provider, whether the first digital certificate of the received first query is identified within the first revocation information repository as being revoked, the determining comprising:
connecting to the first revocation information repository; and
determining based on the first revocation information whether the first digital certificate is revoked; and determining, by the second provider, whether the second digital certificate of the received second query is identified within the second revocation information repository as being revoked, the determining comprising:
connecting to the second revocation information repository; and
determining based on the second revocation information whether the second digital certificate is revoked.

15. The method of claim 14 wherein each provider is in the form of a plug-in module that can be added to or removed from the revocation determination service at will to add or remove access to the corresponding revocation information repository, and wherein each provider includes at least some configuration information for configuring the revocation determination service to employ such provider and the corresponding revocation information repository, the method further comprising storing the included configuration information in a corresponding configuration information record in the configuration store when each provider is added to the revocation determination service.

* * * * *